United States Patent
Deng et al.

(10) Patent No.: US 11,711,601 B2
(45) Date of Patent: Jul. 25, 2023

(54) DOUBLE BARRELS LENS, LENS MODULE AND ASSEMBLING METHOD THEREFOR

(71) Applicant: JIANGXI LIANYI OPTICS CO., LTD, Nanchang (CN)

(72) Inventors: Binquan Deng, Nanchang (CN); Xinyu Xiong, Nanchang (CN)

(73) Assignee: JIANGXI LIANYI OPTICS CO., LTD., Nanchang (CN)

( * ) Notice: Subject to any disclaimer, the term of this patent is extended or adjusted under 35 U.S.C. 154(b) by 275 days.

(21) Appl. No.: 17/138,954

(22) Filed: Dec. 31, 2020

(65) Prior Publication Data

US 2021/0144281 A1 May 13, 2021

Related U.S. Application Data

(63) Continuation-in-part of application No. PCT/CN2020/109675, filed on Aug. 18, 2020.

(30) Foreign Application Priority Data

Nov. 7, 2019 (CN) .......................... 201911082815.8
Apr. 29, 2020 (CN) .......................... 202010356083.3

(51) Int. Cl.
  *H04N 23/55* (2023.01)
  *H04N 23/54* (2023.01)
  *G02B 7/02* (2021.01)

(52) U.S. Cl.
  CPC ............. *H04N 23/55* (2023.01); *G02B 7/021* (2013.01); *G02B 7/025* (2013.01); *H04N 23/54* (2023.01)

(58) Field of Classification Search
  CPC .... H04N 5/2254; H04N 5/2253; H04N 23/55; H04N 23/54; G02B 7/021; G02B 7/025
  See application file for complete search history.

(56) References Cited

U.S. PATENT DOCUMENTS

2006/0011811 A1* 1/2006 Hsin ................. H01L 27/14618
                                                      250/208.1
2007/0133969 A1* 6/2007 Ish-Shalom .......... H04N 5/2253
                                                      396/89

(Continued)

FOREIGN PATENT DOCUMENTS

CN          2694300 Y        4/2005
CN        101127312 A        2/2008

(Continued)

OTHER PUBLICATIONS

CNIPA, Second Office Action tor CN Application No. 202010356083.3, dated Jan. 21, 2022.

(Continued)

*Primary Examiner* — Abdelaaziz Tissire (57) ABSTRACT

The disclosure provides a double barrels lens, a lens module, and an assembling method therefor. The double barrels lens includes a first barrel and a second barrel. The first barrel comprises a first end, a second end and a lens group. External screw threads are provided on an outer surface of the second end. The second barrel includes a first end surface, a second end surface and an inner surface with internal screw threads. The internal screw threads of the second barrel are engaged with the external screw threads of the first barrel. A distance H between an optical center of the lens group and the second end surface of the second barrel, a focal length f of the lens group, and a correction coefficient α meet the expression: H=f+α.

20 Claims, 7 Drawing Sheets

(56) References Cited

U.S. PATENT DOCUMENTS

| | | |
|---|---|---|
| 2016/0295081 A1 | 10/2016 | Emilio |
| 2017/0048432 A1 | 2/2017 | Scott |
| 2017/0134638 A1* | 5/2017 | Wang ............... G02B 7/02 |
| 2017/0153412 A1 | 6/2017 | Ohmori et al. |
| 2018/0231872 A1* | 8/2018 | Tahara ............. G02B 7/021 |
| 2019/0025674 A1* | 1/2019 | Hwang ............. G02B 7/025 |

FOREIGN PATENT DOCUMENTS

| | | |
|---|---|---|
| CN | 102804017 A | 11/2012 |
| CN | 103348275 A | 10/2013 |
| CN | 205861983 U | 1/2017 |
| CN | 207114850 U | 3/2018 |
| CN | 207965298 U | 10/2018 |
| CN | 208026960 U | 10/2018 |
| CN | 108873221 A | 11/2018 |
| CN | 110121017 A | 8/2019 |
| CN | 110351469 A | 10/2019 |
| JP | 2005347397 A | 12/2005 |

OTHER PUBLICATIONS

CNIPA, Third Office Action for CN Application No. 202010356083.3, dated Apr. 14, 2022.

WIPO, International search report for PCT application No. PCT/CN2020/109675, dated Nov. 26, 2020.

WIPO, Written opinion of the international search authority for PCT application No. PCT/CN2020/109675, dated Nov. 26, 2020.

SIPO, First Office Action for CN Application No. 202010356083.3, dated Jul. 16, 2021.

EPO, European Search Report for EP Application No. 20848931.0, dated Oct. 28, 2021.

* cited by examiner

DOUBLE BARRELS LENS, LENS MODULE AND ASSEMBLING METHOD THEREFOR

CROSS-REFERENCE TO RELATED APPLICATION

This application is a continuation-in-part of International Application No. PCT/CN2020/109675 filed on Aug. 18, 2020. The international Application No. PCT/CN2020/109675 claims priority to a Chinese application No. 201911082815.8 filed on Nov. 7, 2019 and a Chinese application No. 202010356083.3 filed on Apr. 29, 2020. The contents of the aforementioned applications are incorporated herein by reference.

TECHNICAL FIELD

The disclosure relates to the field of optical systems, and more particularly, to a double barrels lens, a lens module and an assembling method therefor.

BACKGROUND

With the development of lens imaging technology, lenses are increasingly used in the fields of vehicle monitoring, panoramic cameras, extreme sports and the like. However, the production yield of the lenses in these fields is not good enough, and one reason is that the processing and assembly precision of components included in a lens module fails to meet the requirements thereof.

Common lens modules usually include a lens barrel and optical elements received in the lens barrel. Common lenses are usually an integrated structure. Due to the lens is needed to be assembled with an image sensor assembly on a Printed Circuit Board (PCB) after leaving the factory, so how to ensure that the focus of the lens is highly coincident with the center of an image sensor has always been the research direction for the related technicians.

SUMMARY

The object of the disclosure is to provide a double barrels lens, a lens module and an assembling method therefor.

In a first aspect, the disclosure provides a double barrels lens. The double barrels lens includes a first barrel and a second barrel. The first barrel includes a first end adjacent to an object side, a second end adjacent to an image side, and a lens group disposed in the first barrel, an outer surface of the second end defines external screw threads. The second barrel includes a first end surface adjacent to the object side, a second end surface adjacent to the image side, and an inner surface connected between the first end surface and the second end surface, the inner surface defines internal screw threads, and the internal screw threads of the second barrel are engaged with the external screw threads of the first barrel. A distance H between an optical center of the lens group and the second end surface of the second barrel, a focal length f of the lens group, and a correction coefficient α meet the expression: H=f+α, the correction coefficient is configured to correct a distance between the second end surface and an image sensor assembly, thereby enabling the focus of the lens group to be coincided with the center of an image sensor included in the image sensor assembly.

In a second aspect, the disclosure provides a lens module. The lens module includes a first barrel, a second barrel, and an image sensor assembly. The first barrel includes a first end adjacent to an object side, a second end adjacent to an image side, and a lens group disposed in the first barrel, an outer surface of the second end defines external screw threads. The second barrel includes a first end surface adjacent to the object side, a second end surface adjacent to the image side, and an inner surface connected between the first end surface and the second end surface, the inner surface defines internal screw threads, and the internal screw threads of the second barrel are engaged with the external screw threads of the first barrel. The image sensor assembly includes a substrate, an image sensor electrically connected with the substrate, and an adhesive layer, the substrate is attached to the second end surface of the second barrel via the adhesive layer. A distance H between the optical center of the lens group and the second end surface of the second barrel, a focal length f of the lens group, and a correction coefficient α meet the expression: H=f+α, the correction coefficient represents a distance between the center of the image sensor and the adhesive layer in the direction of an axis of the lens group.

In a third aspect, the disclosure provides a method for assembling a double barrels lens. The method includes: providing a first barrel, a second barrel and an image sensor assembly, the image sensor assembly comprising a substrate and an image sensor positioned at one side of the substrate; engaging internal screw threads of the second barrel with external screw threads of the first barrel; disposing a standard plate at one side of the substrate adjacent to the image sensor, arranging a second end surface of the second barrel at one side of the standard plate away from the substrate, wherein a thickness h of the image sensor in the axial direction of the double barrels lens, a thickness β of the standard plate, and the correction coefficient α meet the expression: h=β+α, wherein the correction coefficient α represents a distance between the center of the image sensor and one side of the standard plate away from the substrate, in the axial direction of the double barrels lens; and adjusting a threaded engagement position of the first barrel and the second barrel, enabling the focus of the lens group coincide with the center of the image sensor, thereby forming the double barrels lens.

In a fourth aspect, the disclosure provides a method for assembling a lens module. The method includes: providing a first barrel, a second barrel and an image sensor assembly; engaging internal screw threads of the second barrel with external screw threads of the first barrel; disposing a standard plate at one side of the substrate adjacent to the image sensor, arranging a second end surface of the second barrel at one side of the standard plate away from the substrate, wherein a thickness h of the image sensor in the axial direction of the double barrels lens, a thickness β of the standard plate, and the correction coefficient α meet the expression: h=β+α, wherein the correction coefficient α represents a distance between the center of the image sensor and one side of the standard plate away from the substrate, in the axial direction of the double barrels lens; adjusting a threaded engagement position of the first barrel and the second barrel, enabling the focus of the lens group coincide with the center of the image sensor, thereby forming the double barrels lens; disposing the double barrels lens at one side of the image sensor assembly adjacent to the image sensor, coating the adhesive layer between the double barrels lens and the substrate of the image sensor assembly, a thickness of the adhesive layer being β; and fixing the double barrels lens and the image sensor assembly.

In the disclosure, the focus of the lens can be coincided with the center of an image sensor, by adjusting the screw threaded engagement of the first barrel and the second barrel. So after fixing the first and the second barrel, the lens has the minimum effective focal length (EFL) tolerance. The double barrels lens provided by the disclosure has a simple structure and a relatively small EFL tolerance. When it is mounted with the matched image sensor assembly, the focus of the double barrels lens can be accurately and quickly coincided with the center of the image sensor, thereby effectively improving the efficiency and the yield when being assembled with the image sensor assembly.

BRIEF DESCRIPTION OF THE DRAWINGS

To explain the technical solutions in the embodiments of the disclosure more clearly, the drawings referred to in the description are briefly introduced below. Obviously, the following drawings just illustrate some embodiments of the disclosure. For those skilled in the art, other drawings also can be obtained based on these drawings without creative effort.

DETAILED DESCRIPTION OF PREFERRED EMBODIMENTS

In order to facilitate a better understanding of the present disclosure, the present disclosure will be further explained below with reference to the accompanying drawings. The embodiments of the present disclosure are shown in the drawings, but the present disclosure is not limited to the above-mentioned preferred embodiments. Rather, these embodiments are provided to make the disclosure of the present disclosure more sufficient.

Conventional lens modules usually include a lens barrel and optical elements received in the lens barrel. Conventional lenses usually have an integrated structure. The inventor found that there are many shortcomings in the prior art, such as: manufacturing tolerances at a height direction of a lens body, cumulative tolerances occurred when assembling the optical elements, manufacturing tolerances occurred when mounting the lens and a holder with an image sensor assembly, patch tolerances at the image sensor assembly etc., and further, when the lens, the holder and the image sensor assembly are assembled, the tolerances may be superimposed and enlarged. Current superimposed tolerance reaches greater than 0.3-0.5 mm, which significantly affect the imaging of the lens module.

After researching the above problem, the inventor also found that, if the tolerance value of EFL of the lens is controlled, the focus of the lens can be quickly and precisely coincided with the center of an image sensor when mounting the lens with the image sensor assembly, thereby improving the product yield and the assembly efficiency. Based on this, a double barrels lens, a lens module and an assembling method therefor are provided in this disclosure.

Figure 1:
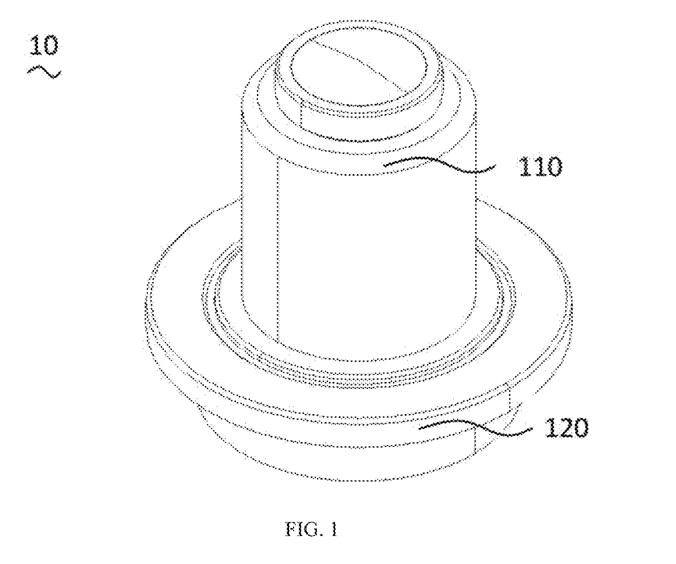
FIG. 1 is a schematic structural diagram of a double barrels lens, according to an embodiment of the disclosure.

FIG. 1 is a schematic structural diagram of a double barrels lens 10 provided in the embodiment. The double barrels lens 10 includes a first barrel 110 and a second barrel 120. The first barrel 110 and the second barrel 120 are assembled together to form the lens. The first barrel 110 is closer to an object side than the second barrel 120. It can be understood that, the first lens barrel 110 and the second lens barrel 120 each can be taken as a single barrel or a combination of several barrels.

Figure 2:
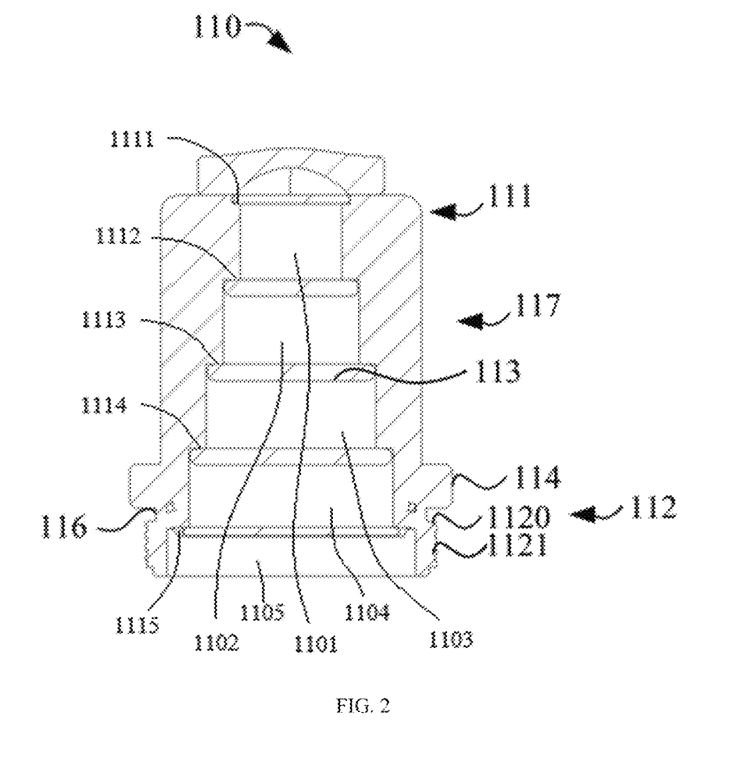
FIG. 2 is a cross-sectional view of a first barrel of the double barrels lens, according to an embodiment of the disclosure.

FIG. 2 illustrates a cross-sectional view of the first barrel 110 of the double barrels lens 10 provided in the embodiment. The first barrel 110 has a hollow straight cylindrical shape and includes a first end 111 adjacent to the object side, a second end 112 adjacent to an image side and a lens group 113 disposed in the first barrel 110.

The first end 111 of the first lens barrel 110 is configured to be cooperated with other barrels or other optical components (e.g., an optical film, a lens cover, etc.). Lights emitted or reflected by an object to-be-photographed enter the internal of the first barrel 110 from the first end 111.

Referring to FIG. 2, the lens group 113 is disposed inside the first barrel 110. The lens group 113 may include several groups of lenses. The periphery of the lens group 113 is enclosed by the first barrel 110 to form an assembly of the groups of lenses. The lenses can be spherical lenses or aspheric lenses. The number and the assembly form of the lenses are not limited in this disclosure. The lights emitted or reflected by the object enter the internal of the first barrel 110 from the first end 111, are focused by the lens group 113 and then are emitted out from the second end 112 of the first lens barrel 110.

The second end 112 of the first barrel 110 is configured to be cooperated with the second barrel 120. In the embodiment, external screw threads 1121 are defined on an outer surface 1120 of the second end 112, and are configured for threaded engagement with an inner surface 123 of the second barrel 120.

The first barrel 110 further includes a main portion 117 connected between the first end 111 and the second end 112.

The first barrel 110 defines a receiving space 1100 for accommodating the lens group 113. The detailed structure of the receiving space 1100 is matched with the lens group 113 and is not limited in the disclosure. For example, the receiving space 1100 of the first barrel 110 includes a number of receiving cavities, i.e., a first receiving cavity 1101, a second receiving cavity 1102, a third receiving cavity 1103, a fourth receiving cavity 1104, and a fifth receiving cavity 1105. Diameters of the receiving cavities are different, and may be gradually increased from top to bottom. As illustrated in FIG. 2, a diameter of the first receiving cavity 1101 is smaller than a diameter of the second receiving cavity 1102, the diameter of the second receiving cavity 1102 is smaller than a diameter of the third receiving cavity 1103, the diameter of the third receiving cavity 1103 is smaller than a diameter of the fourth receiving cavity 1104, and the diameter of the fourth receiving cavity 1104 is smaller than a diameter of the fifth receiving cavity 1105.

The first barrel 110 defines a number of abutting surfaces exposed in the receiving space 1100. For example, there are five abutting surfaces each abutting against one piece of lens of the lens group 113. Each 115 of the abutting surfaces is perpendicular to an optical axis of the lens group 113. In one embodiment, the optical center of the lens group 113 is located on one of the abutting surfaces. As illustrated in FIG. 2, there are a first abutting surface 1111, a second abutting surface 1112, a third abutting surface 1113, a fourth abutting surface 1114, and a fifth abutting surface 1115 spaced arranged from top to bottom, and the optical center is located on the third abutting surface 1113 as shown in the FIG. 4.

Figure 3:
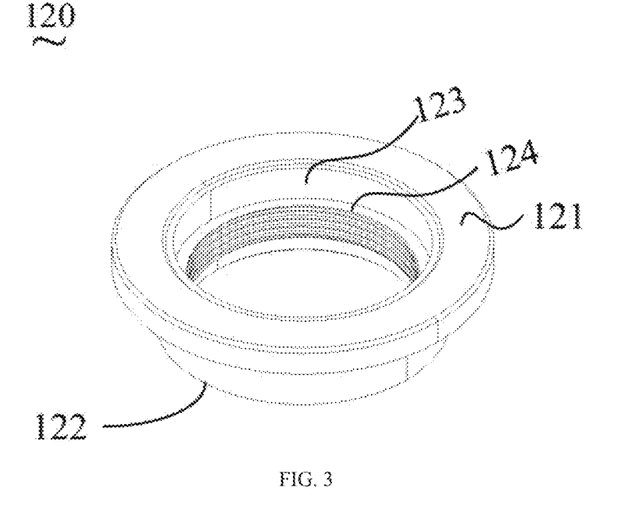
FIG. 3 is a schematic structural diagram of a second barrel of the double barrels lens, according to an embodiment of the disclosure.

FIG. 3 is a schematic structural diagram of the second barrel 120 of the double barrels lens 10 provided by the disclosure. The second barrel 120 includes a first end surface 121 adjacent to the object side, a second end surface 122 adjacent to the image side, and an inner surface 123 connected between the first end surface 121 and the second end surface 122. The inner surface 123 is provided with internal screw threads 124 thereon.

The second barrel 120 includes a lateral part 122 and an axial sidewall 123. The axial sidewall 123 includes a guiding part 1231, an engaging part 1232 and a bottom part 1233 sequentially connected from top to bottom. The lateral part 122 protrudes outwardly. The axial sidewall 123 defines an accommodating space 1200. Specifically, the accommodating space 1200 includes an accommodating cavity 1252, an engaging cavity 1201, and a bottom cavity 1202. The accommodating cavity 1252 is defined and surrounded by the guiding part 1231, the engaging cavity 1201 is defined and surrounded by the engaging part 1232, and the bottom cavity 1202 is defined and surrounded by the bottom part 1233.

Figure 4:
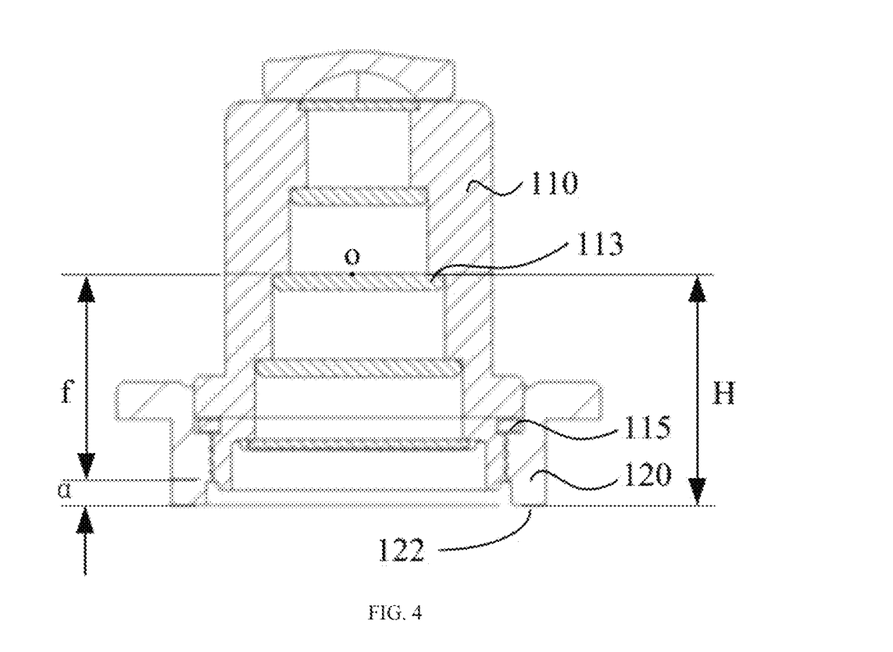
FIG. 4 is a cross-sectional view of the double barrels lens, according to an embodiment of the disclosure.

Referring to FIG. 2 to FIG. 4, the inner screw threads 124 of the second lens barrel 120 are threadedly connected with the outer screw threads 1121 of the first barrel 110. That is, the first barrel 110 and the second barrel 120 can rotate relative to each other via the screw threads during the assembling, thereby changing a position relationship of the first barrel 110 and the second barrel 120, and further changing a position relationship of the lens group 113 and an image sensor assembly 200. The outer screw threads 1121 of the first barrel 110 and the inner screw threads 124 of the second barrel 120 may be in clearance fit.

FIG. 4 illustrates a cross-sectional view of the double barrels lens 10 provided by the embodiment. A focal length of the lens group 113 in the first barrel 110 is represented as f, and a distance between the optical center O of the lens group 1113 and the second end surface 122 of the second barrel 120 is represented as H. In the embodiment, the focal length f of the lens group 113 in the first lens barrel 110, the distance H between the optical center O of the lens group 113 and the second end surface 122 of the second barrel 120, and a correction coefficient α meet the expression: H=f+α. The correction coefficient α is configured to correct the distance between the second end surface 122 and the image sensor assembly 200, so that the focus of the lens group 113 can be coincided with the center of au image sensor 220. It should be noted that the center of the image sensor 220 refers to a center of a surface of the image sensor 220, which is adjacent to the double barrels lens 10. In other words, the image sensor 220 has a light sensitive surface 2201 facing the lens group 113, the center of the image sensor 220 refers to a center of the light sensitive surface 2201.

By adjusting the screw threads between the first barrel 110 and the second barrel 120, it can be realized that the focus of the lens coincides with the center of the image sensor 220, so after fixing the first barrel 110 and the second barrel 120, the lens has the minimum EFL tolerance. When structural parameters of the image sensor assembly 200 (e.g., a distance from the center of the image sensor 220 to a surface of a substrate 210) are known, the correction coefficient α can be obtained based on the focal length of the lens group 113 and the distance from the center of the image sensor 220 to the surface of the substrate 210. The correction coefficient α is configured to make the focus of the lens group 113 coincide with the center of the image sensor 220, by adjusting the screw threads of the first barrel 110 and the second barrel 120 based on the expression H=f+α and then fixing the two. In addition, by defining the optical center O on the third abutting surface 1103, the value of f is limited in a predetermined range, and the adjusting can be performed more easily.

Referring to FIG. 2, to improve the convenience and stability of assembling the first barrel 110 and the second barrel 120, the first barrel 110 may include a limit ring 114. The limit ring 114 is disposed on an outer surface 1120 of the second end 112 of the first barrel 110 and is adjacent to the external screw threads 1121. The limit ring 114 is closer to the object side than the external screw threads 1121.

Further, the limit ring 114 protrudes more outwardly than the external screw threads 1121 in the direction perpendicular to an axis of the first barrel 110. That is, an outer diameter of the limit ring 114 is greater than the maximum outer diameter of the external screw threads 1121. So after assembling, the limit ring 114 can abut against an inner wall of the second barrel 120, which can perform its limiting function better.

Figure 5:
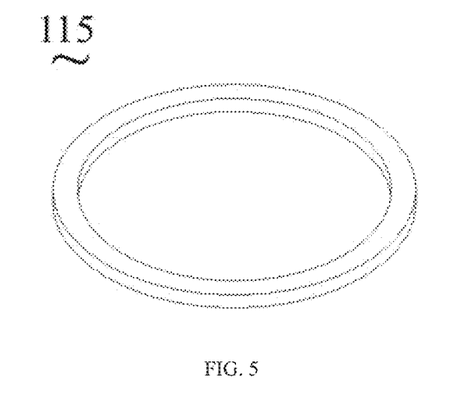
FIG. 5 is a schematic structural diagram of an elastic member of the double barrels lens, according to an embodiment of the disclosure.

Please refer to FIG. 4, the double barrels lens 10 further includes an elastic member 115. There is an annular groove 116 formed between the limit ring 114 and the external screw threads 1121, as shown in FIG. 2. The elastic member 115 can be disposed in the annular groove 116. FIG. 5 illustrates a schematic structural diagram of the elastic member 115 in the double barrels lens 10 provided in the embodiment. The elastic member 115 may be an elastic washer or a wave washer, and it can be selected from materials having light weight, moderate price, and good elastic strain capacity, such as rubber.

Figure 6:
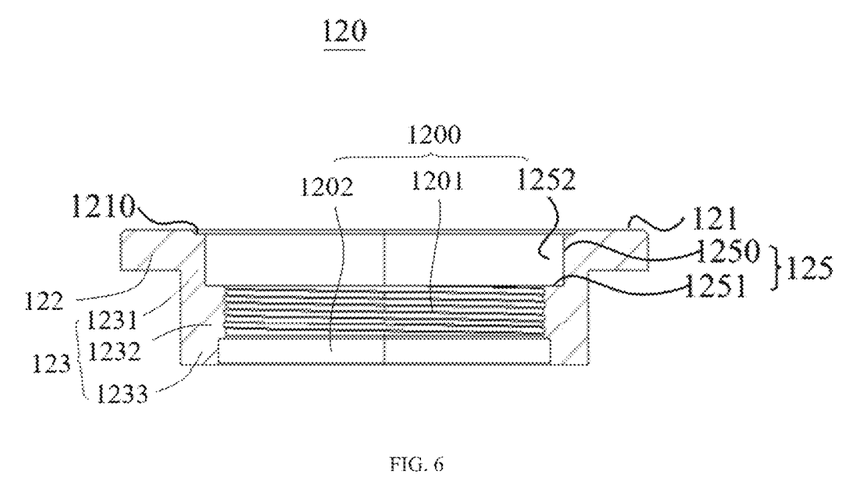
FIG. 6 is a cross-sectional view of the second barrel of the double barrels lens, according to an embodiment of the disclosure.

FIG. 6 illustrates a cross-sectional view of the second barrel 120 of the double barrels lens 10 provided by the embodiment. The second barrel 120 includes a supporting platform 125, the supporting platform 125 is disposed at the inner side of the second barrel 120 and is adjacent to the internal screw threads 124. The supporting platform 125 is closer to the object side than the internal screw threads 124. The supporting platform 125 includes a side surface 1250 and a supporting surface 1251. The side surface 1250 is connected with the first end surface 121. The supporting surface 1251 is connected between the side surface 1250 and the inner surface 123. The side surface 1250 and the supporting surface 1251 define the accommodating cavity 1252, and the accommodating cavity 1252 is configured to accommodate the limit ring 114 and the elastic member 115.

The first end surface 121 is provided with a glue groove 1210 for glue dispensing. The glue groove 1210 may be communicated with the accommodating cavity 1252 of the supporting platform 125, thereby facilitating the glue enters into the accommodating cavity 1252 and making the first lens barrel 110 and the second lens band 120 are fixed better.

Further, an adhesive medium between the first barrel 110 and the second barrel 120 may be one or more selected from AA glue, UV glue, thermosetting glue, UV thermosetting glue, epoxy glue, pressure sensitive glue, moisture curing glue and light-curing glue.

In the embodiment, referring to FIG. 4, the second barrel 120 is configured to mount the first barrel 110, and the adhesive medium is cooperatively used, during the assembling, to fix the first barrel 110 and the second barrel 120. In order to improve the convenience and stability when assembling the second barrel 120, the inner surface 123 of the second barrel 120 is provided with the internal screw threads 124 and the supporting platform 125. When the first barrel 110 is mounted on the second barrel 120, the first barrel 110 is screwed into the second barrel 120, and the external screw threads 1121 are limited by the internal screw threads 124, thereby ensuring the stability of the first lens barrel 110. A bottom surface of the limit ring 114 abuts against a top surface of the supporting platform 125 through the elastic member 115. The elastic member 115 is deformable and positioned in the annular groove 116, thereby ensuring the stability of assembling the first barrel 110 and the second barrel 120. Specifically, the second end 112 of the first barrel 110 is mounted in the accommodating space 1200 of the second barrel 120, the limit ring 114 is substantially received in the accommodating cavity 1252, the lateral part 122 surrounds the limit ring 114, and the elastic member 115 is sandwiched between the limit ring 114 and the supporting surface 1251.

Specifically, referring to FIG. 4, by rotating the screw threads between the first barrel 110 and the second barrel 120, the distance H between the optical center O of the lens group 113 and the second end 112 of the second barrel 120 can be adjusted, thereby making the distance H=f+$\alpha$, where f represents the focal length of the lens group 113, and $\alpha$ represents the correction coefficient configured to correct the distance between the second end surface 122 and the image sensor assembly 200, thereby making the focus of the lens group 113 coincides with the center of the image sensor 220.

The double barrels lens 10 provided by the embodiment, by adjusting the screw threads between the first barrel 110 and the second barrel 120, realizes that the focus of the double barrels lens 10 coincides with the center of the image sensor 220 included in the image sensor assembly 200. Then the first barrel 110 and the second barrel 120 are fixed via glue, and the lens has the minimum EFL tolerance at this time.

The double barrels lens 10 provided by the embodiment has a simple structure and a small EFL tolerance. When it is mounted with the image sensor assembly 200, the focus of the double barrels lens 10 can be accurately and quickly coincided with the center of the image sensor 220, thereby improving the efficiency and the yield when matched with the image sensor assembly 200.

Figure 7:
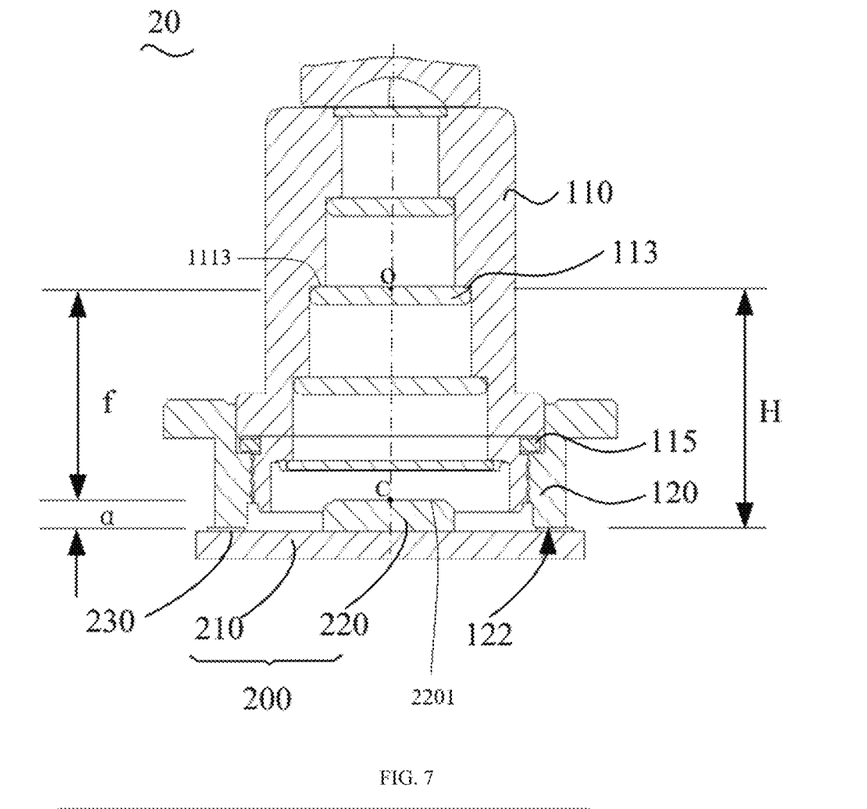
FIG. 7 is a cross-sectional view of a lens module, according to an embodiment of the disclosure.

FIG. 7 illustrates a cross-sectional view of a lens module 20, according to an embodiment of the disclosure. That is, the disclosure further provides the lens module 20, including a first barrel 110, a second barrel 120, and an image sensor assembly 200.

The structure of the first barrel 110 and the second barrel 120 in this embodiment is the same as that of the foregoing embodiment and will not be repeated here again. The image sensor assembly 200 in the embodiment may include a substrate 210, an image sensor 220 electrically connected with the substrate 210, and an adhesive layer 230. The substrate 210 is attached to a second end surface 122 of the second barrel 120 through the adhesive layer 230. The image sensor 220 has a light sensitive surface 2201 facing a lens group 113 received in a receiving space of the first barrel 110. The optical center O of the lens group is located on an optical axis of the lens group 113 and one of the abutting surfaces of the first barrel 110 (e.g., a third abutting surface 1113), the center C of the image sensor 220 refers to a center of the light sensitive surface 2201, the center C of the image sensor 220 is also located on the optical axis of the lens group 113. The first barrel 110 includes a first end 111, a second end 112, and a main portion 117 connected between the first end 111 and the second end 112. The first end 111 and the main portion 117 of the first barrel 110 protrude out from the second barrel 120. The second end 112 of the first barrel 110 is mounted in an accommodating space 1200 of the second barrel 120. The image sensor 220 is received in a bottom cavity 1202 of the accommodating space 1200. The image sensor 220 is also extends into a part of a fifth receiving cavity 1105 of the receiving space.

A focal length f of a lens group 113 in the first barrel 110, a distance H between the optical center O of the lens group 113 and the second end surface 122 of the second barrel 120, and a correction coefficient $\alpha$ meet the expression: H=f+$\alpha$. The correction coefficient $\alpha$ represents a distance between the center C of the image sensor 220 and the adhesive layer 230 at a direction along the optical axis of the lens group 113. The center C of the image sensor 220 is at one side of the image sensor 220 which is away from the substrate 210. The correction coefficient $\alpha$ is configured to correct the distance between the second end surface 122 and the image sensor assembly 200, so it can be realized that the focus of the lens can be accurately and quickly coincided with the center C of the image sensor 220, thereby effectively improving the efficiency and the yield when being matched with the image sensor assembly 200.

Figure 8:
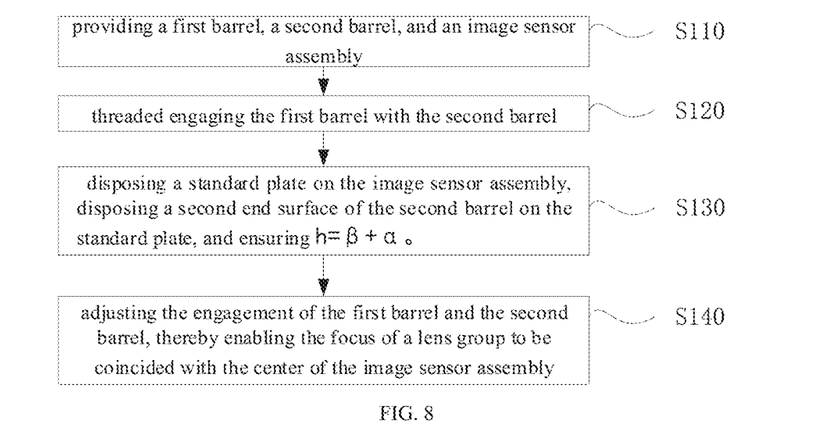
FIG. 8 is a flow chart of assembling the double barrels lens, according to an embodiment of the disclosure.

The disclosure further provides a method for assembling the double barrels lens 10, and FIG. 8 illustrates a flow chart of assembling the double barrels lens 10 according to an embodiment. Details are as follows.

S110: the first barrel 110, the second barrel 120, and the image sensor assembly 200 are provided.

The structure of the first barrel 110 and the second barrel 120 is the same as that shown in FIG. 4, and details can be referred to the description of the corresponding embodiment, which will not be repeated here. The image sensor assembly 200 includes a substrate 210 and the image sensor 220 disposed on one side of the substrate 210, as shown in FIG. 7.

S120: the internal screw threads 124 of the second barrel 20 are engaged with the external screw threads 1121 of the first barrel 110.

The lens group 113 is mounted in the first barrel 110. The second barrel 120 and the first barrel 110 are engaged with the screw threads. In detail, the elastic member 115 is sleeved in the annular groove 116 of the first barrel 110, the first barrel 110 is pre-installed into the second barrel 120, and the second barrel 120 is engaged with the first barrel 110 through the cooperation of the internal screw threads 124 and the external screw threads 1121, and the elastic member 115 abuts against the supporting surface 1251 of the second barrel 120, as shown in FIG. 4.

Figure 9:
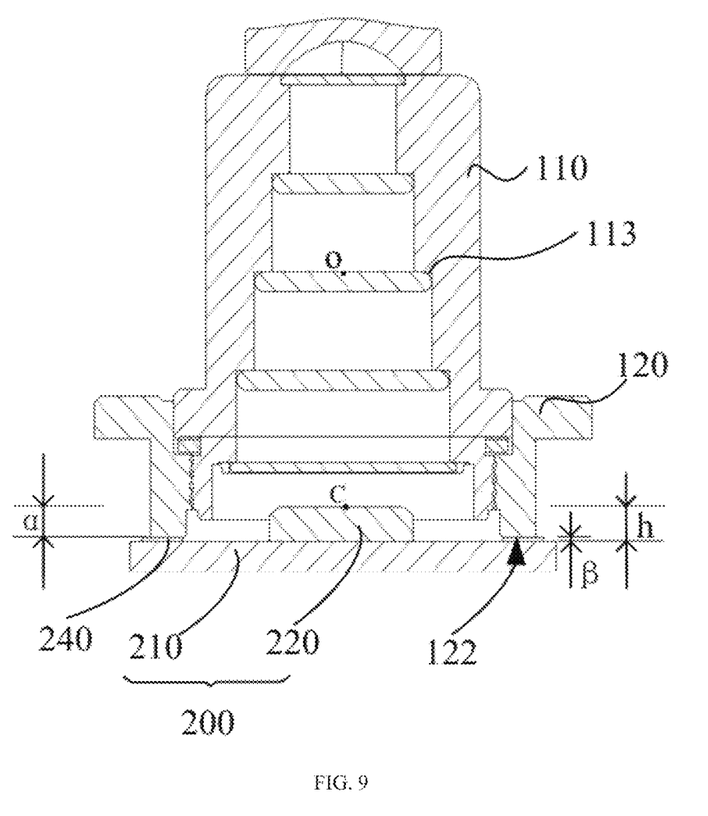
FIG. 9 is a schematic diagram showing an assembled structure of the double barrels lens, according to an embodiment of the disclosure.

S130: a standard plate 240 with a thickness of $\beta$ is provided, the standard plate 240 is disposed at one side of the substrate 210 adjacent to the image sensor 220, the second end surface 122 of the second barrel 120 is disposed at one side of the standard plate 240 away from the substrate 210, and a gap of β is reserved between the second end surface 122 of the second barrel 120 and the substrate 210 of the image sensor assembly 200. FIG. 9 illustrates a schematic diagram showing an assembled structure of the double barrels lens 10. In FIG. 9, the reference numeral 240 represents the standard plate, which makes a thickness of the image sensor 220 h, the thickness of the standard plate 240 β and the correction coefficient α meet the expression: h=β+α.

The correction coefficient α represents a distance between the center C of the image sensor 220 and one side of the standard plate 240 away from the substrate 210, at a direction along an axis of the double barrels lens 10, the center C of the image sensor 220 refers to the center of the light sensitive surface 2201 of the image sensor 220, and the light sensitive surface 2201 is at one side away from the substrate 210.

Optionally, β is greater than or equal to 100 μm while β is less than or equal to 500 μm.

The image sensor assembly 200 is placed on a horizontal working surface, one end of the image sensor 220 faces upward. The standard plate 240 is tightly attached to the top of the image sensor assembly 200, that is, the standard plate 240 is attached to the side of the substrate 210 adjacent to the image sensor 220.

The standard plate 240 can be an annular thin plate. The standard plate 240 is sleeved on an outer periphery of the image sensor 220 and attached to the substrate 210.

S140: the focus of the lens group 113 in the first lens barrel 110 is coincided with the center C of the image sensor 220, by adjusting a threaded engagement position of the first barrel 110 and the second barrel 120, thereby forming the double barrels lens 10. By adjusting the position of the focus of the lens group 113, the focus of the lens group 113 can be coincided with the center C of the image sensor 220.

Optionally, adjusting the threaded engagement position of the first barrel 110 and the second barrel 120 refers to rotating the first barrel 110 relative to the second barrel 120. The distance from the optical center O of the lens group 113 to the center C of the image sensor 220 can be adjusted by adjusting the engagement position of the first barrel 110 relative to the second barrel 120, and this distance is adjusted to be equal to the focal length f of the lens group 113, as such, the double barrels lens 10 can achieve the best imaging distance and has the best imaging performance. After adjusting, the first barrel 110 and the second barrel 120 form the double barrels lens 10.

Figure 10:
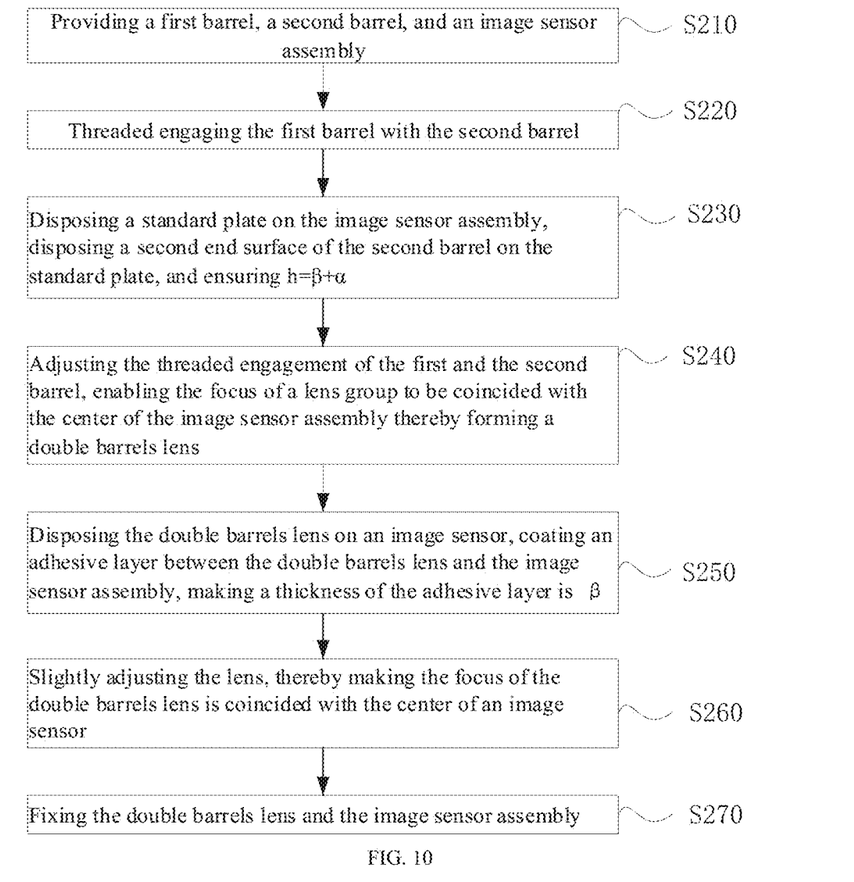
FIG. 10 is a flow chart of assembling the lens module, according to an embodiment of the disclosure.

The disclosure further provides a method for assembling the lens module 20. FIG. 10 illustrates a flowchart of assembling the lens module 20, according to an embodiment of the disclosure, and details are as follows.

S210: the first barrel 110, the second barrel 120, and the image sensor assembly 200 are provided. The structure of the first barrel 110 and the second barrel 120 is the same as that shown in FIG. 4, and details can be referred to the description of the corresponding embodiment, which will not be repeated here. The structure of the image sensor assembly 200 is the same as that shown in FIG. 7, and details could be referred to the description of the corresponding embodiment, which will not be repeated here.

S220: the second barrel 120 is engaged with the first barrel 110 through the cooperation of the external screw threads 1121 and the internal screw threads 124.

The engagement of the second barrel 120 and the first barrel 110 can be referred to the method for assembling the double barrels lens 10 as stated above, and details could be referred to the description of the corresponding embodiment, which will not be repeated here.

S230: a standard plate 240 is provided and disposed at one side of the substrate 210 adjacent to the image sensor 220, the second end surface 122 of the second barrel 120 is arranged at one side of the standard plate 240 away from the substrate 210. A thickness of the image sensor 220 h, a thickness of the standard plate 240 β, and the correction coefficient α satisfy the expression: h=β+α.

The correction coefficient α represents a distance between the center C of the image sensor 220 and one side of the standard plate 240 away from the substrate 210, at a direction along an axis of the double barrels lens 10. It should be noted that, the center C of the image sensor 220 refers to the center of a surface of the image sensor 220, and the surface is located at the side away from the substrate 210.

The thickness of the standard plate 240 is β, β is greater them or equal to 100 μm, and β is less them or equal to 500 μm. The standard plate 240 may be an annular sheet in shape. In the assembling, the standard plate 240 is sleeved on an outer periphery of the image sensor 220 and attached to the substrate 210. An upper surface of the standard plate 240 is a flat horizontal surface, which is beneficial to adjust the focus of the lens group 113 to be coincided with the center C of the image sensor 220.

S240: by adjusting a threaded engagement position of the first barrel 110 and the second barrel 120, the focus of the lens group 113 coincides with the center C of the image sensor 220, thereby forming the double barrels lens 10.

Adjusting the threaded engagement position of the first barrel 110 and the second barrel 120 can be referred to the above method, and details are not repeated here. The double barrels lens 10 can be used as a finished product or a semi-finished product. In the following steps, the double barrels lens 10 can be assembled with the image sensor assembly 200 to form the lens module 20, or can be assembled with other image sensor assembly to form any other lens module. When assembling the double barrels lens 10 and the image sensor assembly 200, the double barrels lens 10 and the standard plate 240 are removed from the top of the image sensor assembly 200 first. When the double barrels lens 10 is assembled with other image sensor assembly, the double barrels lens 10 can be directly disposed on the other image sensor assembly. The following steps describe processes of assembling the double barrels lens 10 and the image sensor assembly 200, as an example. Please also refer to FIG. 11, which illustrates an assembled structure of the lens module 20 provided in the embodiment.

Figure 11:
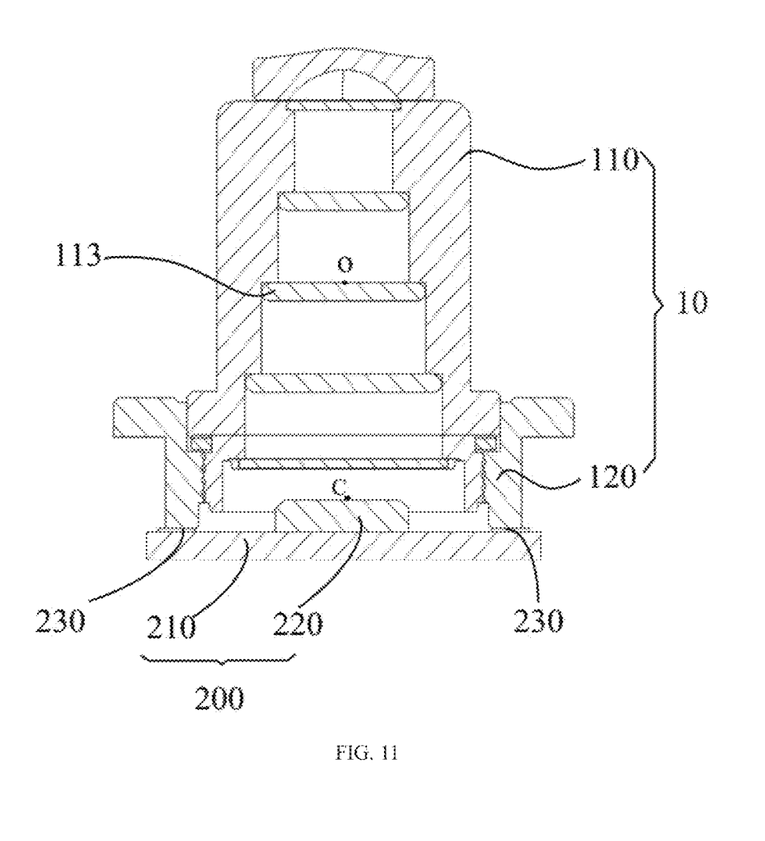
FIG. 11 is a schematic diagram showing an assembled structure of the lens module, according to an embodiment of the disclosure.

S250: the double barrels lens 10 is disposed at one side of the image sensor assembly 200, and this side is adjacent to the image sensor 220. The adhesive layer 230 is coated between the double barrels lens 10 and the substrate 210 of the image sensor assembly 200, and a thickness of the adhesive layer 230 is β.

The material of the adhesive layer 230 can be one or more selected from AA glue, UV glue, thermosetting glue, UV thermosetting glue, epoxy resin glue, pressure sensitive glue, moisture curing, light-curing glue, etc.

The adhesive layer 230 is coated between the double barrels lens 10 and the substrate 210 of the image sensor component 200, can be referred to that the adhesive layer 230 is coated on a surface of the substrate 210, or the adhesive layer 230 is coated on the second end surface 122 of the double barrels lens 10. When coating the adhesive layer 230, the thickness of the adhesive layer 230 should be ensured to be uniform, so the EFL tolerance can be reduced as much as possible.

S260: the double barrels lens 10 is adjusted again to make the focus of the double barrels lens 10 coincide with the center C of the image sensor 220.

Adjusting the double barrels lens 10 includes AA focusing, and the AA focusing makes the double barrels lens 110 image clearly and consistently.

S270: the double barrels lens 10 and the image sensor assembly 200 are fixed.

Specifically, fixing the double barrels lens 10 and the image sensor assembly 200 may include: baking and fixing the adhesive layer 230; testing modulation transfer function (MTF) values of the double barrels lens 10; if the MTF values meet a predetermined value, dispensing glue in the glue groove 1210, which is positioned between the first barrel 110 and the second barrel 120, and then curing the glue; if the MTF values fail to meet the predetermined value, performing a second focusing operation, that is, rotating the first barrel 110 relative to the second barrel 120, and then making the focus of the lens group 113 coincide with the center C of the image sensor 220 by refocusing. After the second focusing, the MTF testing is performed again until the MTF values meet the predetermined value, and then the glue dispensing is performed and the glue is cured next.

The double barrels lens 10 and the lens module 20 provided by the embodiment adopt the methods mentioned above. These methods not only can accurately and quickly realize the coincidence of the focus of the lens with the center C of the image sensor 220, but also can minimize the EFL tolerance of the double barrels lens 10, thereby effectively improving the efficiency and the yield of assembling.

The above embodiments just describe some implementation manners of the disclosure. It should be noted that, those skilled in the art can make various modifications, additions or replacements to the specific embodiments, but they will not deviate from the spirit of the application or exceed the range defined by the appended claims.

What is claimed is:

1. A double barrels lens, comprising:
   a first barrel, comprising a first end adjacent to an object side, a second end adjacent to an image side, and a lens group disposed in the first barrel, an outer surface of the second end defining external screw threads; and
   a second barrel, comprising a first end surface adjacent to the object side, a second end surface adjacent to the image side, and an inner surface connected between the first end surface and the second end surface, the inner surface defining internal screw threads, and the internal screw threads of the second barrel being engaged with the external screw threads of the first barrel;
   wherein a distance H between an optical center of the lens group and the second end surface of the second barrel, a focal length f of the lens group, and a correction coefficient $\alpha$ meet the expression: $H=f+\alpha$, the correction coefficient is configured to correct a distance between the second end surface and an image sensor assembly, thereby enabling the focus of the lens group to be coincided with a center of an image sensor included in the image sensor assembly;
   wherein the first barrel further comprises a limit ring and an annular groove, the limit ring is disposed on the outer surface of the second end, the annular groove is defined between the limit ring and the external screw threads, and the annular groove is concave inward relative to the external screw threads at a direction perpendicular to an axis of the first barrel;
   wherein the second barrel comprises a supporting boss, the supporting boss is disposed at an inner side of the second barrel, the supporting boss comprises a side surface and a supporting surface, the side surface is connected with the first end surface, the supporting surface is connected between the side surface and the inner surface, the supporting surface is directly connected to the internal screw threads, and the limit ring abuts against the side surface of the supporting boss;
   wherein the double barrels lens further comprises an elastic member, the elastic member is disposed in the annular groove and disposed on the supporting surface.

2. The double barrels lens according to claim 1, wherein the limit ring is adjacent to the external screw threads, and the limit ring is closer to the object side than the external screw threads; the limit ring protrudes more outwardly than the external screw threads, at the direction perpendicular to the axis of the first barrel; and the supporting boss is adjacent to the internal screw threads and closer to the object side than the internal screw threads; and the side surface and the supporting surface define an accommodating cavity configured to accommodate the limit ring and the elastic member.

3. The double barrels lens according to claim 2, wherein a glue groove is defined at the first end surface, and the glue groove is in communication with the accommodating cavity of the supporting boss.

4. The double barrels lens according to claim 1, wherein the first lens comprises a plurality of abutting surfaces each abutting against a piece of lens included in the lens group, and the optical center of the lens group is positioned on one of the abutting surfaces.

5. The double barrels lens according to claim 1, wherein a bottom surface of the limit ring is configured to abut against the supporting surface through the elastic member, and a bottom surface of the elastic member is configured to directly abut against the supporting surface, to make the elastic member be sandwiched between the limit ring and the supporting surface.

6. The double barrels lens according to claim 1, wherein $\alpha=h-\beta$, $\beta$ represents a thickness of an adhesive layer configured to attach the second end surface and the image sensor assembly, and h represents a thickness of the image sensor in a direction of an axis of the lens group, and the thickness of the adhesive layer is determined to be the same as that of a standard plate configured to assist to adjust the focus of the lens group to be coincided with the center of the image sensor.

7. A lens module, comprising:
   a first barrel, comprising a first end adjacent to an object side, a second end adjacent to an image side, and a lens group disposed in the first barrel, an outer surface of the second end defining external screw threads;
   a second barrel, comprising a first end surface adjacent to the object side, a second end surface adjacent to the image side, and an inner surface connected between the first end surface and the second end surface, the inner surface defining internal screw threads, and the internal screw threads of the second barrel being engaged with the external screw threads of the first barrel; and
   an image sensor assembly, comprising a substrate, an image sensor electrically connected with the substrate, and an adhesive layer, the substrate being attached to the second end surface of the second barrel via the adhesive layer;
   wherein a distance H between the optical center of the lens group and the second end surface of the second barrel, a focal length f of the lens group, and a correction coefficient $\alpha$ meet the expression: $H=f+\alpha$, the correction coefficient represents a distance between a center of the image sensor and the adhesive layer in a direction of an axis of the lens group;

wherein the first barrel further comprises a limit ring and an annular groove, the limit ring is disposed on the outer surface of the second end, the annular groove is defined between the limit ring and the external screw threads, and the annular groove is concave inward relative to the external screw threads at a direction perpendicular to an axis of the first barrel;

wherein the second barrel comprises a supporting boss, the supporting boss is disposed at an inner side of the second barrel, the supporting boss comprises a side surface and a supporting surface, the side surface is connected with the first end surface, the supporting surface is connected between the side surface and the inner surface, the supporting surface is directly connected to the internal screw threads, and the limit ring abuts against the side surface of the supporting boss;

wherein the double barrels lens further comprises an elastic member, the elastic member is disposed in the annular groove and disposed on the supporting surface.

8. The lens module according to claim 7, wherein a thickness of the adhesive layer is represented as $\beta$, and a thickness of the image sensor in the direction of the axis of the lens group meet an expression: $h=\alpha+\beta$.

9. The lens module according to claim 7, wherein the limit ring is adjacent to the external screw threads, and the limit ring is closer to the object side than the external screw threads; the limit ring protrudes outwardly than the external screw threads in the direction perpendicular to the axis of the first barrel; and the supporting boss is adjacent to the internal screw threads and closer to the object side than the internal screw threads, the side surface and the supporting surface define an accommodating cavity configured to accommodate the limit ring and the elastic member.

10. The lens module according to claim 9, wherein a glue groove is defined at the first end surface, and the glue groove is in communication with the accommodating cavity of the supporting boss.

11. The lens module according to claim 7, wherein the first lens comprises a plurality of abutting surfaces each abutting against a piece of lens included in the lens group, the optical center of the lens group is positioned on one of the abutting surfaces.

12. The lens module according to claim 7, wherein a bottom surface of the limit ring is configured to abut against the supporting surface through the elastic member, and a bottom surface of the elastic member is configured to directly abut against the supporting surface, to make the elastic member be sandwiched between the limit ring and the supporting surface.

13. The lens module according to claim 7, wherein $\alpha=h-\beta$, $\beta$ represents the thickness of the adhesive layer, and h represents a thickness of the image sensor in the direction of the axis of the lens group, and the thickness of the adhesive layer is determined to be the same as that of a standard plate configured to assist to adjust the focus of the lens group to be coincided with the center of the image sensor.

14. A method for assembling a lens module, comprising:
providing a first barrel, a second barrel and an image sensor assembly, the image sensor assembly comprising a substrate and an image sensor positioned at one side of the substrate; the first barrel comprising a first end adjacent to an object side, a second end adjacent to an image side, and a lens group disposed in the first barrel, an outer surface of the second end defining external screw threads; the second barrel comprising a first end surface adjacent to the object side, a second end surface adjacent to the image side, and an inner surface connected between the first end surface and the second end surface, the inner surface defining internal screw threads, and the internal screw threads of the second barrel being engaged with the external screw threads of the first barrel; wherein the first barrel further comprises a limit ring and an annular groove, the limit ring is disposed on the outer surface of the second end, the annular groove is defined between the limit ring and the external screw threads, and the annular groove is concave inward relative to the external screw threads at a direction perpendicular to an axis of the first barrel; the second barrel comprises a supporting boss, the supporting boss is disposed at an inner side of the second barrel, the supporting boss comprises a side surface and a supporting surface, the side surface is connected with the first end surface, the supporting surface is connected between the side surface and the inner surface, the supporting surface is directly connected to the internal screw threads, and the limit ring abuts against the side surface of the supporting boss; and the double barrels lens further comprises an elastic member, the elastic member is disposed in the annular groove and disposed on the supporting surface;

engaging the internal screw threads of the second barrel with the external screw threads of the first barrel;

disposing a standard plate at one side of the substrate adjacent to the image sensor, arranging the second end surface of the second barrel at one side of the standard plate away from the substrate, wherein a thickness h of the image sensor in the axial direction of the double barrels lens, a thickness $\beta$ of the standard plate, and a correction coefficient $\alpha$ meet the expression: $h=\beta+\alpha$, wherein the correction coefficient $\alpha$ represents a distance between the center of the image sensor and one side of the standard plate away from the substrate, in the axial direction of the double barrels lens;

adjusting an engagement of the first barrel and the second barrel, enabling the focus of the lens group to be coincided with the center of the image sensor, thereby forming a double barrels lens;

disposing the double barrels lens at one side of the image sensor assembly adjacent to the image sensor, coating an adhesive layer between the double barrels lens and the substrate of the image sensor assembly; and fixing the double barrels lens and the image sensor assembly.

15. The method according to claim 14, wherein before engaging the internal screw threads of the second barrel with the external screw threads of the first barrel, the method further comprises:
sleeving the elastic member in the annular groove of the first barrel, and positioning the first barrel into the second barrel.

16. The method according to claim 14, before fixing the double barrels lens and the image sensor assembly, the method further comprising:
adjusting the double barrels lens, thereby making the focus of the double barrels lens coincide with the center of the image sensor.

17. The method according to claim 14, before fixing the double barrels lens and the image sensor assembly, the method further comprising:

curing the adhesive layer, and testing MFT values of the double barrels lens; when MTF values meet a predetermined value, dispensing glue in a glue groove between the first barrel and the second barrel, and curing the glue.

18. The method according to claim 17, further comprising:

when the MTF values fail to meet the predetermined value, rotating the first barrel relative to the second barrel, thereby making the focus of the lens group coincide with the center of the image sensor, and then testing MTF values again until the MTF values meet the predetermined value.

19. The method according to claim 14, wherein a bottom surface of the limit ring is configured to abut against the supporting surface through the elastic member, and a bottom surface of the elastic member is configured to directly abut against the supporting surface, to make the elastic member be sandwiched between the limit ring and the supporting surface.

20. The method according to claim 14, wherein $\alpha=h-\beta$, $\beta$ represents a thickness of the adhesive layer, and h represents a thickness of the image sensor in the axial direction of the double barrels lens, and the thickness of the adhesive layer is determined to be the same as that of the standard plate configured to assist to adjust the focus of the lens group to be coincided with the center of the image sensor.

* * * * *